United States Patent
Wang et al.

(10) Patent No.: US 9,585,067 B2
(45) Date of Patent: Feb. 28, 2017

(54) PROCEDURES FOR OPERATING IN LONG TERM EVOLUTION IDLE MODE

(71) Applicant: INTERDIGITAL PATENT HOLDINGS, INC., Wilmington, DE (US)

(72) Inventors: Peter S. Wang, E. Setauket, NY (US); Ulises Olvera-Hernandez, Kirkland (CA); Shankar Somasundaram, Sunnyvale, CA (US); Rajat P. Mukherjee, Toronto (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 14/720,144

(22) Filed: May 22, 2015

(65) Prior Publication Data
US 2015/0257054 A1   Sep. 10, 2015

Related U.S. Application Data

(63) Continuation of application No. 12/505,031, filed on Jul. 17, 2009, now Pat. No. 9,042,883.
(Continued)

(51) Int. Cl.
*H04W 36/00* (2009.01)
*H04J 11/00* (2006.01)
(Continued)

(52) U.S. Cl.
CPC ..... *H04W 36/0072* (2013.01); *H04J 11/0086* (2013.01); *H04J 11/0093* (2013.01);
(Continued)

(58) Field of Classification Search
None
See application file for complete search history.

(56) References Cited

U.S. PATENT DOCUMENTS

| 5,930,720 A | 7/1999 | Zhao et al. |
| 6,553,229 B1 | 4/2003 | Dent |

(Continued)

FOREIGN PATENT DOCUMENTS

| CA | 2 823 801 | 7/2008 |
| EP | 1 524 871 | 4/2005 |

(Continued)

OTHER PUBLICATIONS

Nokia Corporation et al., "Simple CSG for REL8," 3GPP TSG-RAN WG2 Meeting #61bis, R2-081735, Shenzhen, China, Mar. 31-Apr. 4, 2008).

(Continued)

*Primary Examiner* — Brandon Renner
(74) *Attorney, Agent, or Firm* — Volpe and Koenig, P.C.

(57) ABSTRACT

Various procedures for operating a wireless transmit/receive unit (WTRU) in Long Term Evolution (LTE) Idle mode are described. The procedures include: methods for applying cell reselection priorities in the WTRU, methods for converting a mobility state of the WTRU between operating modes, a method for assigning a mobility state to the WTRU, and a method for determining whether the WTRU may access a closed subscriber group (CSG) cell. Also described are methods and an apparatus on the operations of the LTE mobility state transition mechanism between LTE WTRU Idle mode and Connected mode, a definition of the Pcompensation parameter for LTE, inter-frequency and inter-radio access technology cell reselection priority validity definitions, and coverage extension principles for CSG cells.

12 Claims, 4 Drawing Sheets

Related U.S. Application Data (60) Provisional application No. 61/086,674, filed on Aug. 6, 2008.

(51) Int. Cl.

| | | |
|---|---|---|
| *H04W 8/18* | (2009.01) | |
| *H04W 36/08* | (2009.01) | |
| *H04W 48/02* | (2009.01) | |
| *H04W 52/24* | (2009.01) | |
| *H04W 48/12* | (2009.01) | |
| *H04W 84/10* | (2009.01) | |

(52) U.S. Cl.
CPC ............. *H04W 8/18* (2013.01); *H04W 8/183* (2013.01); *H04W 36/08* (2013.01); *H04W 48/02* (2013.01); *H04W 52/243* (2013.01); *H04W 48/12* (2013.01); *H04W 84/105* (2013.01)

(56) References Cited

U.S. PATENT DOCUMENTS

| | | |
|---|---|---|
| 8,649,291 B2 | 2/2014 | Wang et al. |
| 2005/0143082 A1 | 6/2005 | Yang |
| 2006/0258386 A1 | 11/2006 | Jeong et al. |
| 2007/0173255 A1* | 7/2007 | Tebbit .................. H04W 36/30 455/434 |
| 2008/0176565 A1 | 7/2008 | Eerolainen et al. |
| 2008/0287125 A1 | 11/2008 | Hind et al. |
| 2009/0181676 A1 | 7/2009 | Lee et al. |
| 2009/0270092 A1 | 10/2009 | Buckley et al. |
| 2010/0240368 A1 | 9/2010 | Fox et al. |

FOREIGN PATENT DOCUMENTS

| | | |
|---|---|---|
| EP | 2 111 074 | 10/2009 |
| TW | 200833134 A | 8/2008 |
| WO | 2006/122233 A2 | 11/2006 |
| WO | 2008/054668 | 5/2008 |
| WO | 2008088168 A1 | 7/2008 |
| WO | 2009/045078 | 4/2009 |
| WO | 2009/120138 | 10/2009 |
| WO | 2009/149431 A1 | 12/2009 |

OTHER PUBLICATIONS

Rapporteur (Samsung), "Miscelaneous [sic] clarifications/corrections," 3GPP TSG-RAN2#61bis meeting, R2-081690, Shenzhen, China, Mar. 31-Apr. 4, 2008).
Alcatel Lucent et al., "Corrections to RRC connection release," 3GPP TSG RAN WG2 #62bis, R2-08334 (Jun. 30-Jul. 4, 2008).
Interdigital Communications, LLC, "LS on the Contents on P-BCH", 3GPP TSG RAN WG2 Meeting #60bis; R2-080475 (Sevilla, Spain, Jan. 10-14, 2008).
NTT Docomo et al., "CSG with limited open access," 3GPP TSG RAN WG2 #60, R2-075150 (Nov. 2007).
NTT Docomo, Inc., "Idle mode mobility control principles," 3GPP TSG RAN WG2 #59bis, R2-074001, Shanghai, China (Oct. 8-12, 2007).
Qualcomm Europe, "UTRA HNB Idle Mode (Re)selection and UE Access Control," 3GPP TSG-RAN WG2 Meeting #62-bis, R2-083392 (Jun. 30-Jul. 4, 2008).
Third Generation Partnership Project, "Technical Specification Group Radio Access Network; Evolved Universal Terrestrial Radio Access (E-UTRA); User Equipment (UE) Procedures in Idle Mode (Release 8)", 3GPP TS 36.304, V8.1.0, (Mar. 2008).
Third Generation Partnership Project, "Technical Specification Group Radio Access Network; Evolved Universal Terrestrial Radio Access (E-UTRA); User Equipment (UE) Procedures in Idle Mode (Release 8)", 3GPP TS 36.304, V8.2.0, (May 2008).
Third Generation Partnership Project, "Technical Specification Group Radio Access Network; Evolved Universal Radio Access (E-UTRA); User Equipment (UE) Procedures in Idle Mode (Release 8)", 3GPP TS 36.304, V8.6.0, (Jun. 2009).
Third Generation Partnership Project, "Technical Specification Group Radio Access Network; Evolved Universal Terrestrial Access (E-UTRA) Radio Control (RRC); Protocol Specification (Release 8)", 3GPP TS 36.331 V8.2.0 (May 2008).
Third Generation Partnership Project, "Technical Specification Group Radio Access Network; Evolved Universal Terrestrial Radio Access (E-UTRA) Radio Resource Control (RRC); Protocol Specification (Release 8)", 3GPP TS 36.331 V8.6.0 (Jun. 2009).
Third Generation Partnership Project, "Technical Specification Group Radio Access Network; User Equipment (UE) Procedures in Idle Mode and Procedures for Cell Reselection in Connected Mode (Release 8)", 3GPP TS 25.304, V8.6.0, (Jun. 2009).
Third Generation Partnership Project, "Technical Specification Group Services and System Aspects; Service requirements for Home NodeBs and Home eNodeBs; (Release 9)," 3GPP TS 22.220 V0.3.0 (Jul. 2008).
Third Generation Partnership Project, "Technical Specification Group Services and System Aspects; Service requirements for Home NodeBs and Home eNodesBs; (Release 9)," 3GPP TS 22.220 V9.1.1 (Jun. 2009).
Third Generation Partnership Project, "Technical Specification Group Radio Access Network; Mobility Procedures for Home NodeB; Overall Description; Stage 2 (Release 9)," 3GPP TS 25.367 V9.0.0 (Jun. 2009).
Third Generation Partnership Project, "Technical Specification Group Radio Access Network; Mobility Procedures for Home NodeB; Overall Description; Stage 2 (Release 8)," 3GPP TS 25.367 V8.1.0 (Mar. 2009).
Third Generation Partnership Project, "Technical Specification Group Services and System Aspects; Service accessibility (Release 1999)," 3GPP TS 22.011 V3.8.0 (Sep. 2002).
Third Generation Partnership Project, "Technical Specification Group Services and System Aspects; Service accessibility (Release 4)," 3GPP TS 22.011 V4.8.0 (Sep. 2002).
Third Generation Partnership Project, "Technical Specification Group Services and System Aspects; Service accessibility (Release 5)," 3GPP TS 22.011 V5.1.0 (Sep. 2002).
Third Generation Partnership Project, "Technical Specification Group Services and System Aspects; Service accessibility (Release 6)," 3GPP TS 22.011 V6.4.0 (Jun. 2004).
Third Generation Partnership Project, "Technical Specification Group Services and System Aspects; Service accessibility (Release 7)," TS 22.011 V7.9.0 (Mar. 2008).
Third Generation Partnership Project, "Technical Specification Group Services and System Aspects; Service accessibility (Release 9)," 3GPP TS 22.011 V9.1.0 (Mar. 2009).
Third Generation Partnership Project, "Technical Specification Group Services and System Aspects; Service accessibility (Release 8)," 3GPP TS 22.011 V8.8.0 (Jun. 2009).
Third Generation Partnership Project, "Technical Specification Group Services and System Aspects; Service accessibility (Release 8)," 3GPP TS 22.011 V8.4.1 (Jun. 2008).
Third Generation Partnership Project, "Technical Specification Group Radio Access Network; User Equipment (UE) procedures in idle mode and procedures for cells reselection in connected mode(Release 1999)," 3GPP TS 25.304 V3.14.0 (Mar. 2004).
Third Generation Partnership Project, "Technical Specification Group Radio Access Network; User Equipment (UE) procedures in idle mode and procedures for cell reselection in connected mode(Release 4)," 3GPP TS 25.304 V4.8.0 (Mar. 2004).
Third Generation Partnership Project, "Technical Specification Group Radio Access Network; User Equipment (UE) procedures in idle mode and procedures for cell reselection in connected mode (Release 5)," 3GPP TS 25.304 V5.9.0 (Sep. 2005).
Third Generation Partnership Project, "Technical Specification Group Radio Access Network; User Equipment (UE) procedures in idle mode and procedures for cell reselection in connected mode (Release 6)," 3GPP TS 25.304 V6.10.0 (Mar. 2008).

(56) References Cited

OTHER PUBLICATIONS

Third Generation Partnership Project, "Technical Specification Group Radio Access Network; User Equipment (UE) procedures in idle mode and procedures for cell reselection in connected mode (Release 7)," 3GPP TS 25.304 V7.6.0 (May 2008).
Third Generation Partnership Project, "Technical Specification Group Radio Access Network; User Equipment (UE) procedures in idle mode and procedures for cell reselection in connected mode (Release 7)," 3GPP TS 25.304 V7.7.0 (Sep. 2008).
Third Generation Partnership Project, "Technical Specification Group Radio Access Network; User Equipment (UE) procedures in idle mode and procedures for cell reselection in connected mode (Release 8)," 3GPP TS 25.304 V8.2.0 (May 2008).
T-Mobile et al., "Lifetime of cell reselection priorities," 3GPP TSG RAN2#62bis, R2-083191 (Jun. 30-Jul. 4, 2008).
TS 36.304 Rapporteur (Nokia Corporation), "Editorial corrections to 36.304," 3GPP TSG-RAN2 Meeting #62, R2-082830 (May 5-9, 2008).
Vodafone et al., "CR to 22.011 on Additional HNB/HeNB operator requirements," 3GPP TSG-SA1 #41, S1-082061 (Jul. 21-25, 2008).
Vodafone, "Idle mode requirements to support Hybrid Access Mode for HNB," Change Request to 25.367, 3GPP TSG-RAN WG2 Meeting #65bis, R2-092581, Seoul, Republic of Korea (Mar. 23-27, 2009).

\* cited by examiner

PROCEDURES FOR OPERATING IN LONG TERM EVOLUTION IDLE MODE

CROSS REFERENCE TO RELATED APPLICATIONS

This application is a continuation U.S. application Ser. No. 12/505,031 filed Jul. 17, 2009, which will issue on May 26, 2015 as U.S. Pat. No. 9,042,883 and claims the benefit of U.S. Provisional Application No. 61/086,674, filed Aug. 6, 2008, which are incorporated by reference as if fully set forth herein.

FIELD OF INVENTION

This application is related to wireless communications.

BACKGROUND

In the Third Generation Partnership (3GPP) long term evolution (LTE), measurements take the wireless transmit/receive unit (WTRU) mobility state into account. For example, whether a WTRU is moving with low or zero speed has a different effect on the measurements than a WTRU moving with high speed on a rural area or a highway due to the Doppler Effect in the radio transmission and reception. Therefore in LTE, different scaling factors for measurements apply to the WTRU in different mobility states to balance or normalize the Doppler Effects on different mobility speeds. How to maintain the WTRU mobility states between Idle mode and Connected mode is not specified.

In LTE, the WTRU has three mobility states: low mobility, medium mobility, and high mobility. In Idle mode, when the WTRU does not have a call, it counts the number of reselections. In Connected mode, when the WTRU has a call, it counts the number of handovers. The WTRU counts the number of reselections or the number of handovers and determines whether it is not moving (also called stationary), it is moving slow (also called normal mobility), or it is moving fast (also called high mobility). Reselections and handovers are treated differently because the time needed to reselect is different from the time needed to perform a handover. The mobility states cannot be carried over from Idle mode to Connected mode for most purposes. A mechanism of adapting the mobility state when the WTRU transitions from Idle mode to Connected mode is needed. Also, the mobility state between modes should not be lost, meaning if the WTRU is moving fast while in Idle mode, and then transitions to Connected mode, the WTRU should not have to restart the mobility state determination. For example, if the WTRU is moving fast (i.e., in the high mobility state) it has an impact on how the WTRU performs reselections and handovers.

When the WTRU attempts to reselect to another cell, it needs to make sure that the target cell satisfies the minimum signal level, signal strength, and condition. The WTRU compares this data with some parameters that are transmitted by the network. That comparison is embodied in an equation called the S criteria. The S criteria effectively says how strong or weak the target cell is. If the S criteria, which is the difference between the signal strength and the threshold signaled by the network, is below zero, then the WTRU does not have to consider the target cell. If the S criteria is above zero, then the WTRU may proceed to camp on the target cell. The S criteria means that the signal strength of the target cell has to absolutely meet at least a minimum threshold, below which the network thinks that the target cell is not worth camping on. The LTE WTRU cell selection and reselection basic rules have the WTRU check the serving cell or another cell's signal strength using the S criteria. In LTE, one component in the S criteria, i.e., the Pcompensation parameter, remains undefined and needs to be specified.

LTE includes the concept of priority in cell reselection, which means that there are certain frequencies, for example, UMTS or GSM, that are given a priority. The WTRU has to follow the priority, so, for example, frequency "a" may be given priority one, frequency "b" may be given priority two, or vise versa. The WTRU has to make sure that it first tries to camp on frequency "a," and if it cannot find the cell of frequency "a," then it goes to frequency "b." Currently, in the standards, there is no clear indication how long these priorities are valid. The WTRU may be signaled a priority using system information or dedicated RRC messages. But when the WTRU considers the priorities to no longer be valid or expired is not described.

In UMTS systems, there is a parameter called Pcompensation, which compensates for the pathloss when a WTRU performs cell reselection. There is no clear indication in LTE to date of how the Pcompensation parameter is going to be designed. This disclosure proposes some definitions of Pcompensation.

SUMMARY

Various procedures for operating a WTRU in LTE Idle mode are described. The procedures include: methods for applying cell reselection priorities in the WTRU, methods for converting a mobility state of the WTRU between operating modes, a method for assigning a mobility state to the WTRU, and a method for determining whether the WTRU may access a closed subscriber group cell. Also described are methods and an apparatus on the operations of the LTE mobility state transition mechanism between LTE WTRU Idle mode and Connected mode, a definition of the Pcompensation parameter for LTE, inter-frequency and inter-RAT cell reselection priority validity definitions, and coverage extension principles for closed subscriber group (CSG) cells.

BRIEF DESCRIPTION OF THE DRAWINGS

A more detailed understanding may be had from the following description, given by way of example in conjunction with the accompanying drawings, wherein.

DETAILED DESCRIPTION

When referred to hereafter, the term "wireless transmit/receive unit (WTRU)" includes, but is not limited to, a user equipment (UE), a mobile station, a fixed or mobile subscriber unit, a pager, a cellular telephone, a personal digital assistant (PDA), a computer, or any other type of user device capable of operating in a wireless environment. When referred to hereafter, the term "base station" includes, but is not limited to, a Node B, an evolved Node B (eNB), a site controller, an access point (AP), or any other type of interfacing device capable of operating in a wireless environment.

Figure 1:
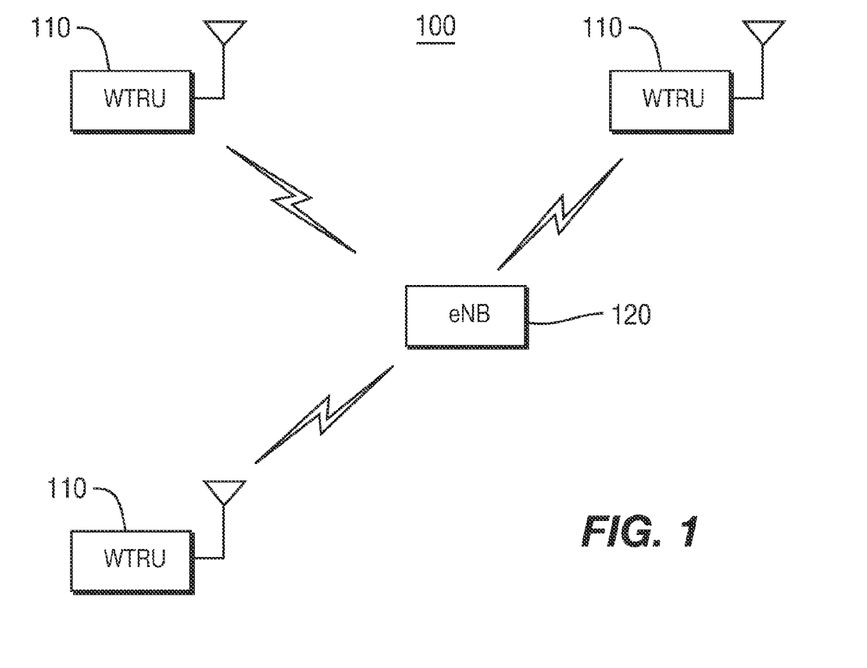
FIG. 1 shows an example wireless communication system including a plurality of wireless transmit/receive units (WTRUs) and an evolved Node B (eNB)

FIG. 1 shows an example wireless communication system 100 including a plurality of WTRUs 110 and an eNB 120. As shown in FIG. 1, the WTRUs 110 are in communication with the eNB 120. It should be noted that, although an example configuration of WTRUs 110 and an eNB 120 is depicted in FIG. 1, any combination of wireless and wired devices may be included in the wireless communication system 100.

Figure 2:
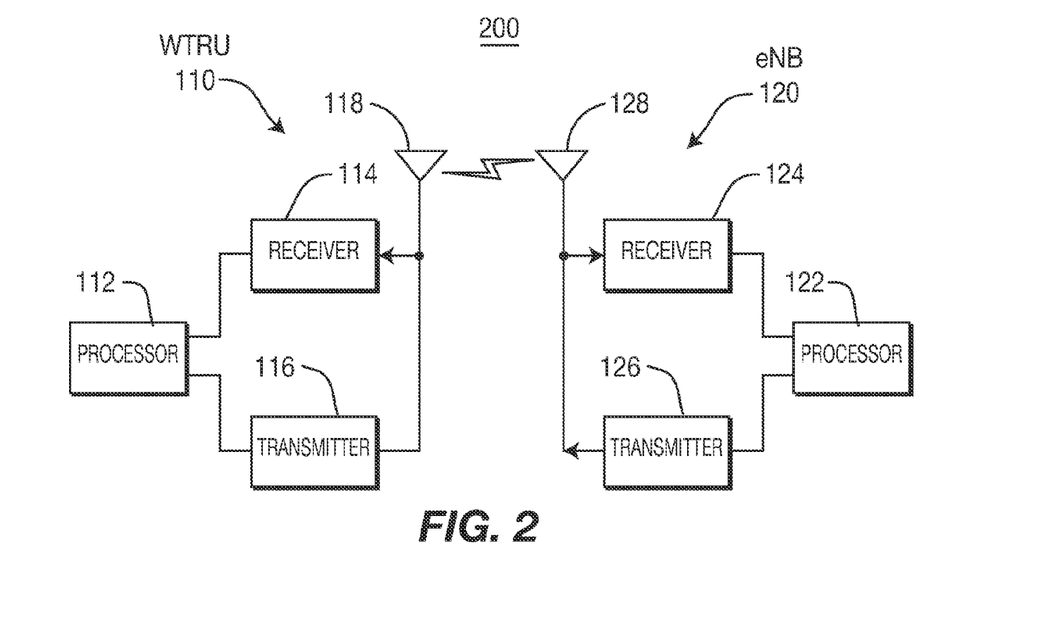
FIG. 2 is an example functional block diagram of one WTRU and the eNB of FIG. 1.

FIG. 2 is an example functional block diagram 200 of one WTRU 110 and the eNB 120 of the wireless communication system 100 of FIG. 1. As shown in FIG. 2, the WTRU 110 is in communication with the eNB 120.

In addition to the components that may be found in a typical WTRU, the WTRU 110 includes a processor 112, a receiver 114, a transmitter 116, and an antenna 118. The receiver 114 and the transmitter 116 are in communication with the processor 112. The antenna 118 is in communication with both the receiver 114 and the transmitter 116 to facilitate the transmission and reception of wireless data. The processor 112 is configured to determine the LTE mobility state of the WTRU, determine cell reselection criteria, determine cell reselection priority validity, and determine a CSG cell coverage extension.

In addition to the components that may be found in a typical eNB, the eNB 120 includes a processor 122, a receiver 124, a transmitter 126, and an antenna 128. The receiver 124 and the transmitter 126 are in communication with the processor 122. The antenna 128 is in communication with both the receiver 124 and the transmitter 126 to facilitate the transmission and reception of wireless data. The processor 122 is configured to determine the LTE mobility state of the WTRU, determine cell reselection criteria, determine cell reselection priority validity, and determine a CSG cell coverage extension.

Validity Lifetime for LTE Reselection Priorities

The WTRU may use one or more of the following conditions to maintain its reselection priorities. In all the conditions listed below, the WTRU's already present priorities may be overwritten when new priorities are signaled by the network.

(1) WTRU power-on/WTRU power-off. In this case, once the WTRU receives the cell reselection priorities, they are retained until the WTRU is turned off or until the cell reselection priorities are overwritten by the network.

(2) Next system information (SI) update. The WTRU may maintain its cell reselection priorities until the next SI update. When the SI changes, the WTRU re-reads the SI and updates the cell reselection priorities. There might be certain conditions when the WTRU does not update the cell reselection priorities based on the new SI. For example, if the WTRU already has dedicated cell reselection priorities, then it might not override the cell reselection priorities provided by the SI.

In general, the cell reselection priority information provided by the SI is broadcast, so all WTRUs receive the same cell reselection priority information. Dedicated cell reselection priorities are sent to a given WTRU. So if a WTRU has dedicated cell reselection priorities, in the next SI update when the SI changes, the WTRU might not override the dedicated cell reselection priorities with the cell reselection priorities from the SI.

Figure 3:
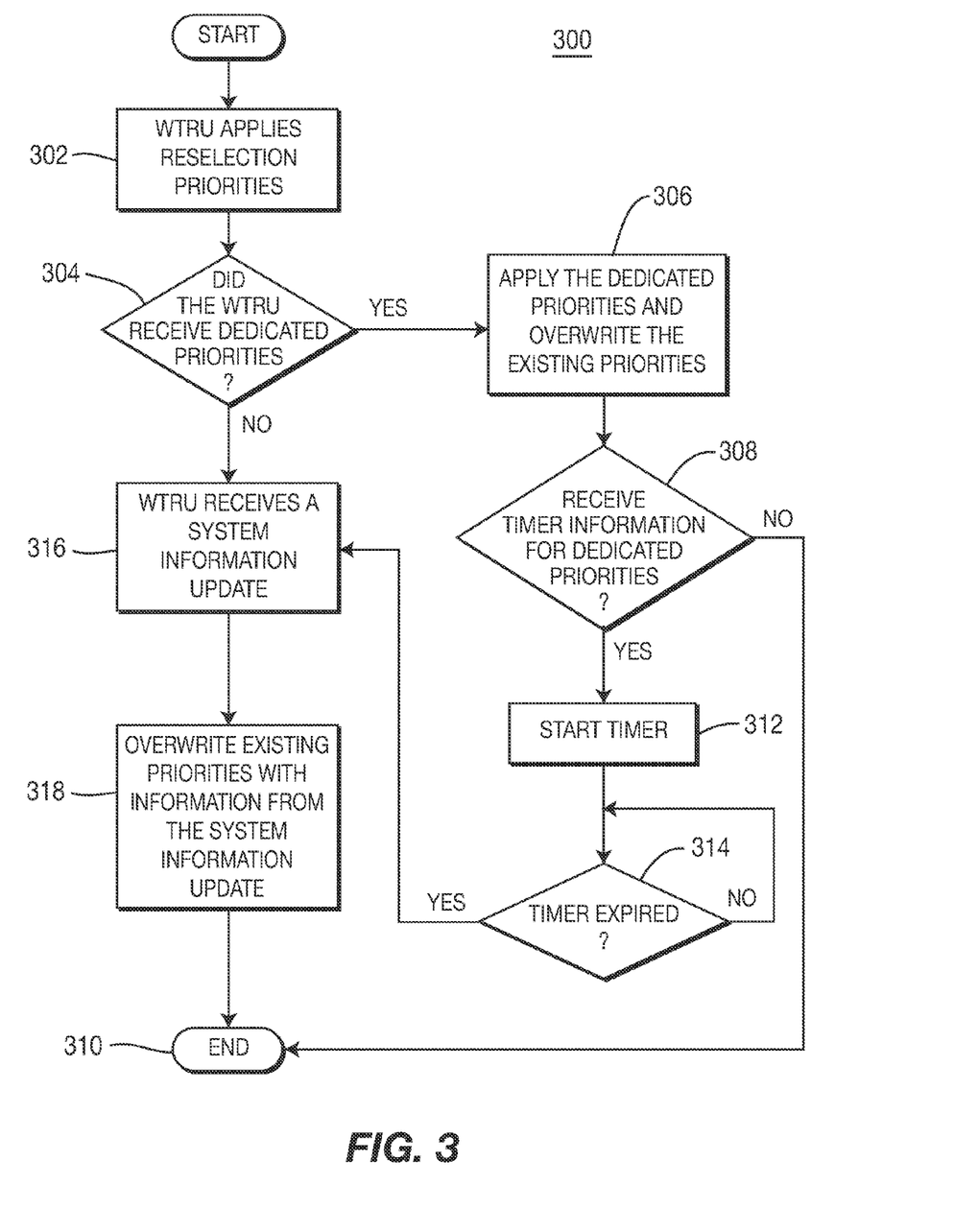
FIG. 3 is a flowchart of a method for updating cell reselection priority information.

FIG. 3 is a flowchart of a method 300 for updating cell reselection priority information. The method begins with the WTRU applying existing cell reselection priorities (step 302). A determination is made whether the WTRU received dedicated cell reselection priorities (step 304). If the WTRU has received dedicated cell reselection priorities, then the WTRU applies the dedicated cell reselection priorities, overwriting the existing cell reselection priorities (step 306).

The WTRU may also receive timer information with the dedicated cell reselection priorities, to indicate the length of time that the dedicated cell reselection priorities are valid. If the WTRU does not receive timer information for the dedicated cell reselection priorities (step 308), then the method terminates (step 310). If the WTRU receives timer information for the dedicated cell reselection priorities (step 308), the timer is started (step 312). When the timer expires (step 314), this means that the dedicated cell reselection priorities are no longer valid.

If the WTRU has not received any dedicated cell reselection priorities (step 304) or if the timer has expired (step 314), then the WTRU waits to receive a SI update (step 316). After receiving the SI update, the WTRU overwrites the existing cell reselection priorities with information contained in the SI update (step 318) and the method terminates (step 310).

(3) Timer information. Along with the cell reselection priorities signaled to the WTRU, an optional parameter called validity time is defined, which tells the WTRU how long it may retain the cell reselection priorities. When the timer expires, the cell reselection priority information is discarded. In one embodiment, the timer only applies to dedicated cell reselection priorities received by the WTRU. In another embodiment, the timer is started when the WTRU enters the Connected mode.

When the timer expires, the WTRU re-reads the SI or requests the network to provide new cell reselection priorities. Alternatively, once the timer expires, the WTRU waits for the next available SI reading opportunity to update its cell reselection priorities. While the validity timer is running, the WTRU's cell reselection priorities may be overwritten if the WTRU receives dedicated cell reselection priorities.

Figure 4:
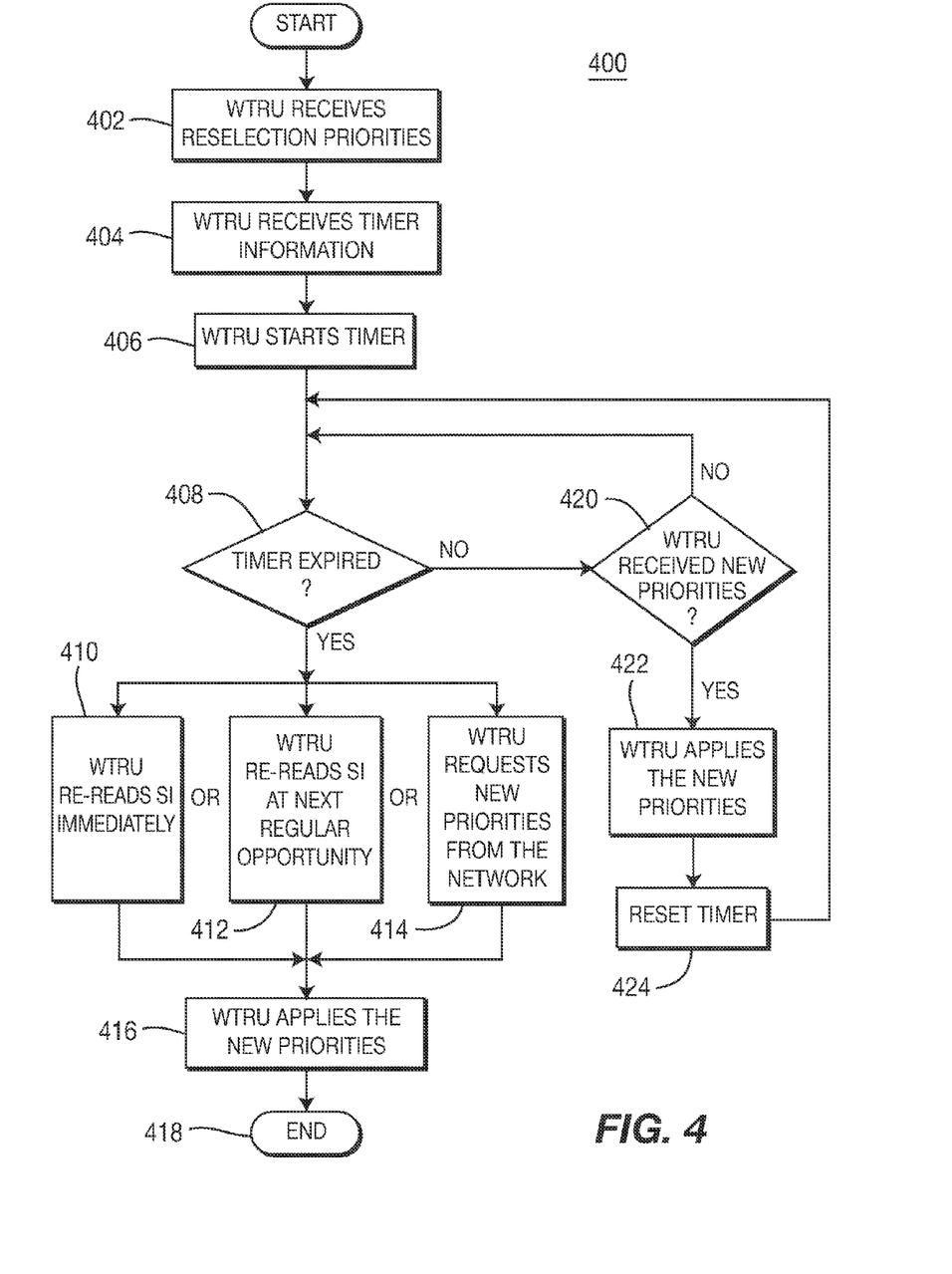
FIG. 4 is a flowchart of a method for updating cell reselection priority information in connection with a timer.

FIG. 4 is a flowchart of a method 400 for updating cell reselection priority information in connection with a timer. The method begins with the WTRU receiving cell reselection priorities (step 402). The WTRU also receives timer information (step 404) and starts a timer based on this information (step 406). A determination is made whether the timer has expired (step 408). If the timer has expired, then the WTRU has one of three options: the WTRU re-reads the SI immediately (step 410), the WTRU waits for the next regular opportunity to read the SI (step 412), or the WTRU requests new cell reselection priority information from the network (step 414). After the WTRU has received the new cell reselection priority information, it applies the new cell reselection priority information (step 416) and the method terminates (step 418).

If the timer has not expired (step 408), a determination is made whether the WTRU has received dedicated cell reselection priorities (step 420). If the timer has not expired, the WTRU waits until the timer has expired (step 408) or the WTRU receives dedicated cell reselection priorities (step 420). If the WTRU has received dedicated cell reselection priorities (step 420), then it applies the new cell reselection priority information (step 422) and resets the timer (step 424).

(4) Scope of cell reselection priorities. The scope of the cell reselection priorities may be defined as a simple variable with a few enumerated values. For example, the enumerated values may include: (a) only valid within a public land mobile network (PLMN) or (b) valid across many PLMNs. As another example, the enumerated values may include: (a) only valid within a Tracking Area, (b) valid across many Tracking Areas, (c) only valid within one LTE frequency layer, or (d) valid within several LTE frequency layer(s) (multicast-broadcast single frequency network (MBSFN) or not). The definition of the scope of the cell reselection priorities includes information for the WTRU to know when to read the new cell reselection priorities.

(5) RRC message forcing the WTRU to read the system information blocks (SIBs). The WTRU may be forced to read the SIBs to obtain new cell reselection priority information by using RRC messages. Existing RRC messages may also be used to force the WTRU to update its cell reselection priority information. For example, when the WTRU goes into Idle mode, the RRC connection release or reject message may include a simple enumerated information element (IE) which may force the WTRU to read the SIBs.

In one embodiment, if the WTRU is in Idle mode and the SI changes, the network may send a new RRC message, like a paging message, to the WTRU to force the WTRU to read the SIBs to obtain the new SI. One reason that the SI may change is if the cell reselection priorities change; however, the SI may change for any reason.

Mobility State Handling Between Idle Mode and Connected Mode

There are three mobility states defined in LTE: the normal state, the medium state, and the high state. In the current 3GPP LTE specification (TS 36.304), the LTE WTRU mobility state in Idle mode is determined based on a number of cell reselections experienced during a time period $T_{CRmax}$ and a comparison to the threshold values $N_{CR\_H}$ and $N_{CR\_M}$. In Connected mode, a number of handovers is used as a criteria for mobility.

Given the above conditions, to retain or maintain the mobility state between the Idle mode and the Connected mode, a relationship between the mobility states and their quantifying/qualifying parameters is proposed. For example, X number of cell reselections in Idle mode may map to Y number of handovers in Connected mode or vice versa. Mapping the number of cell reselections to the number of handovers or the number of handovers to the number of cell reselections may reflect the geographical cell size.

Convert the Mobility State Directly Between the LTE WTRU Modes

Several rules for defining a direct mapping for the WTRU mobility state between Idle mode and Connected mode are proposed.

(1) Symmetric same state direct mapping. In general, state A in Idle mode maps to state A in Connected mode. For example, the Idle mode normal state maps to the Connected mode normal state, the Idle mode medium state maps to the Connected mode medium state, and the Idle mode high state maps to the Connected mode high state. This approach might be useful because when the WTRU changes modes (Idle to Connected or Connected to Idle), the WTRU's moving speed remains the same.

(2) Asymmetric state direct mapping. In general, state A in Idle mode maps to state B in Connected mode or vice versa. For example, the Idle mode normal state maps to the Connected mode medium state, the Idle mode medium state and high state both map to the Connected mode high state. The latter mapping assumes that the measurement requirement is stricter in the Connected mode, thus converting a low mobility state in the Idle mode to a higher mobility state in the Connected mode. If the measurement requirement is stricter in the Idle mode, a higher mobility state in the Connected mode may be mapped to a lower mobility state in the Idle mode, e.g., the Connected mode normal state maps to the Idle mode medium state, the Connected mode medium state and high state both map to the Idle mode high state, etc.

(3) Reset the mobility state. Alternatively, the WTRU may reset its mobility state to the stationary or normal mobility state when it changes modes, irrespective of the WTRU's mobility state in the previous mode.

Figure 5:
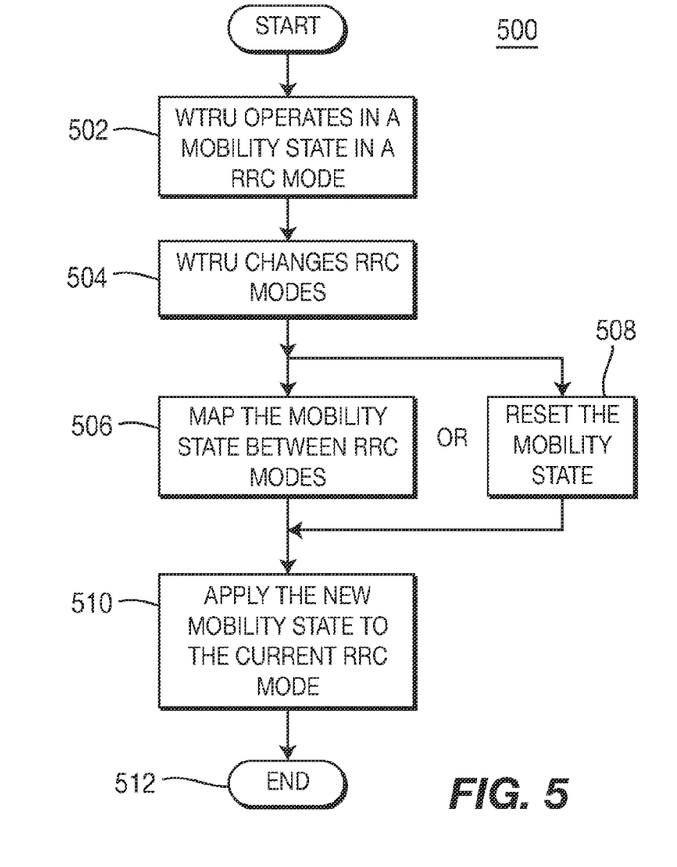
FIG. 5 is a flowchart of a method for converting the WTRU's mobility state when the WTRU changes RRC modes.

FIG. 5 is a flowchart of a method 500 for converting the WTRU's mobility state when the WTRU changes RRC modes. The method 500 begins with the WTRU operating in a mobility state in an RRC mode (step 502). For example, the WTRU may be operating in the low mobility state while in Idle mode. The WTRU changes RRC modes, for example from Idle mode to Connected mode (step 504). The WTRU's mobility state may be mapped between the two RRC modes (step 506) or the mobility state may be reset upon changing RRC modes (step 508). The new mobility state is applied to the current RRC mode (step 510) and the method terminates (step 512).

Inherit the Mobility State and Adjust the State During WTRU Mode Change

This method proposes that when the WTRU changes RRC operating modes (i.e., between Idle mode and Connected mode), the mobility state is handled as follows.

(1) Inherit the mobility state initially when the RRC mode changes.

(2) Adjust the mobility state in the next short period with the inherited parameter values in the old mode (e.g., Idle mode) to parameter values in the new mode (e.g., Connected mode) according to the following conversions. The "short period" is a predefined period of time in which the WTRU needs to finish converting the parameter values between RRC modes. The short period may be known to the WTRU or may be signaled to the WTRU by the network.

(a) Define system-configurable conversion factors (one for all parameters or one for each parameter) to convert the mobility state parameters from one RRC mode to the other for: the state thresholds (i.e., $N_{CR\_H}$ or $N_{CR\_M}$ to the comparable handover (HO) thresholds), the time periods, and the current cell reselection (CR) or HO count. As an example, employing the conversion factors $FAC_{CR\_HO\_H}$ and $FAC_{CR\_HO\_M}$ to scale the $N_{CR\_H}$ and the $N_{CR\_M}$ thresholds (the variables for HO may be $N_{HO\_H}$ and $N_{HO\_M}$) with respect to CR and HO, such that $$N_{CR\_H} = FAC_{CR\_HO\_H} \times N_{HO\_H} \qquad \text{Equation (1)}$$

$$N_{CR\_M} = FAC_{CR\_HO\_M} \times N_{HO\_M} \qquad \text{Equation (2)}$$

The factor $FAC_{T\_CR\_HO}$ may be used to convert $T_{MaxHyst}$ between CR and HO.

$$T_{MaxHyst-CR} = FAC_{T\_CR\_HO} \times T_{MaxHyst-HO} \qquad \text{Equation (3)}$$

(b) Alternatively, maintain the state thresholds and the time period, but convert the counts between the CR and HO. Therefore, a conversion factor ($FAC_{CR\_HO\_COUNT}$) is needed when the WTRU's RRC mode changes (from Idle mode to Connected mode or vise versa). For example, the counts before the state change are Count$_{HO}$ and Count$_{CR}$, respectively. When the state changes, the scale factor FAC$_{CR\_HO\_COUNT}$ is applied to convert the values.

$$\text{Count}_{HO} = \text{Count}_{HO} \times \text{FAC}_{CR\_HO\_COUNT} \quad \text{Equation (4)}$$

$$\text{Count}_{CR} = \text{Count}_{CR} \times \text{FAC}_{CR\_HO\_COUNT} \quad \text{Equation (5)}$$

The resulting new scaled counts may be used to compare to the unchanged threshold values in the new state. For example, the scaled Count$_{CR}$ is compared with the unscaled N$_{CR\_H}$ threshold.

Network-Based Mobility State Assignments

Based on the detected or reported WTRU mobility state, the network may assign a mobility state for the WTRU when the RRC mode changes. The assigned mobility state may be temporary and may be adjusted later using new parameters.

(1) The WTRU reports its mobility state by sending a RRC message. The WTRU retains its current mobility state for a predetermined period of time or the WTRU adjusts its mobility state during this period using one of the methods described above. One of the existing RRC messages (for example, RRC-Connection-Req or RRC-Re-Establishment-Req) may be used or other new or existing RRC messages may be defined or modified for this purpose. The WTRU reports its mobility state when it changes RRC modes.

(2) The network then assigns or informs the WTRU of its mobility state by another RRC message (for example, RRC-Connection-Setup, Re-Establishment-Resp, HO-Command, RRC-Connection-Release, or any other defined or modified RRC message).

(3) A RRC message may be defined so that when the WTRU has established a connection with the network, it sends a mobility state request message with the mobility state calculated from the Idle mode. The network sends back a mobility state confirm message with the mobility state it thinks the WTRU should have. During this period, the WTRU may not have to perform any mobility calculations.

Figure 6:
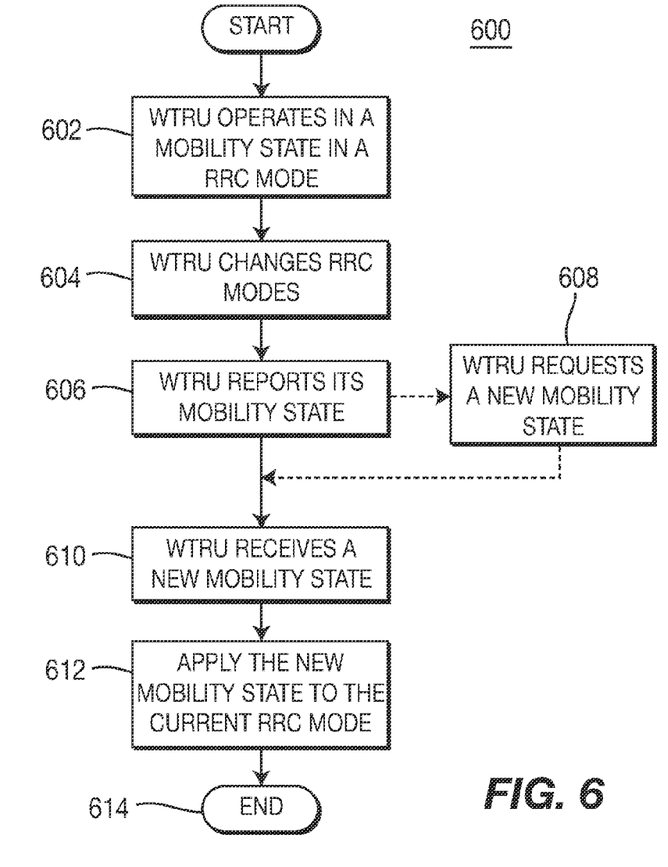
FIG. 6 is a flowchart of a method for assigning the WTRU's mobility state by the network when the WTRU changes RRC modes.

FIG. 6 is a flowchart of a method 600 for assigning the WTRU's mobility state by the network when the WTRU changes RRC modes. The method 600 begins with the WTRU operating in a mobility state in an RRC mode (step 602). For example, the WTRU may be operating in the low mobility state while in Idle mode. The WTRU changes RRC modes, for example from Idle mode to Connected mode (step 604).

The WTRU reports its current mobility state to the network (step 606). Optionally, the WTRU may request that the network assign it a new mobility state (step 608). The WTRU receives a new mobility state (step 610), either upon the network's initiation or in response to a request from the WTRU. The new mobility state is applied to the current RRC mode (step 612) and the method terminates (step 614).

S Criteria Pcompensation

The cell selection criterion S is fulfilled when:

$$\text{Srxlev} > 0 \quad \text{Equation (6)}$$

where $$\text{Srxlev} = Q_{rxlevmeas} - (Q_{rxlevmin} - Q_{rxlevminoffset}) - P\text{compensation} \quad \text{Equation (7)}$$

where Srxlev is the cell selection received signal level value in dB, $Q_{xlevmeas}$ is the measured cell received signal level value (RSRP), $Q_{rxlevmin}$ is the minimum required received signal level in the cell (in dBm), and $Q_{rxlevminoffset}$ is only applied when a cell is evaluated for cell selection as a result of a periodic search for a higher priority PLMN while camped normally in a visited PLMN.

In UMTS, the Pcompensation parameter (which may be defined as, for example, max(UE_TXPWR_MAX_RACH–P_MAX, 0)) is used to take the uplink interference into account for the cell measurement. In UMTS, each WTRU's uplink power is another WTRU's interference. When the maximum allowed uplink transmit power (UE_TXPWR_MAX_RACH) is high, it implies that the uplink interference is also high. Therefore, it presents as an unfavorable factor to the S criteria in terms of cell selection or cell reselection (i.e., $Q_{xlevmeas}$ needs to be stronger to fulfill the S criteria).

In LTE, the intra-cell interference between sub-carriers is supposedly none or very low. Thus, the interference between WTRUs in terms of uplink RACH is assumed (in this case) to be small to negligible. The following options are proposed.

(1) Remove the Pcompensation term from the equation such that $$\text{Srxlev} = Q_{xlevmeas} - (Q_{rxlevmin} - Q_{rxlevminoffset}) \quad \text{Equation (8)}$$

The value of $Q_{rxlevminoffset}$ should already compensate for the value of Pcompensation, meaning that $Q_{rxlevminoffset}$ may be defined so that Pcompensation is not needed.

(2) Allow the Pcompensation term in Equation (7) to affect the Srxlev in both ways, i.e., require $Q_{xlevmeas}$ to be stronger or weaker to fulfill the S criteria. Set Pcompensation=(UE_TXPWR_MAX_RACH–P_MAX). Consequently, if the system published UE_TXPWR_MAX_RACH is greater than the WTRU's P_MAX, Pcompensation is positive, requiring $Q_{xlevmeas}$ to be higher to meet the condition Srxlev>0. If UE_TXPWR_MAX_RACH is smaller than the WTRU's P_MAX, Pcompensation is negative, requiring $Q_{rxievmeas}$ to be lower to meet the condition Srxlev>0 (as opposed to in UMTS, where Pcompensation=max(UE_TXPWR_MAX_RACH–P_MAX, 0)). This means that when UE_TXPWR_MAX_RACH is smaller than the WTRU's P_MAX, Pcompensation is 0, thereby not contributing to the equation.

(3) Another option for Pcompensation is to tie the uplink compensation with the pathloss (the distance from the eNB, i.e., the pathloss=CELL_TX_POWER–$Q_{rxievmeas}$) that the WTRU measures in the LTE cell. So the greater the value of the pathloss, the stronger or weaker is the compensation to the S criteria. For the Srxlev formula in Equation (7), Pcompensation=compensate (pathloss, network or system defined comp-value-table), where compensate may be any function returning the compensation value based on the current WTRU pathloss and the network defined compensation vectors.

Two examples on the pathloss to compensation value mapping are as follows.

(a) The Pcompensation value results from a function of the pathloss value.

$$P\text{compensation} = (a \times \text{pathloss}) + b \quad \text{Equation (9)}$$

where a is a scaling factor and b is an offset. Both a and b may be any positive or negative numbers, fractions, or 0. It is noted that this may be linear (i.e., a and b are consistently one value throughout) or discrete, applying to ranges of measured pathloss. For example, for pathloss measurements between 30 and 40 dBs, a is ⅔ and b is 4, while for pathloss measurements between 40 and 50 dBs, a is ¾ and b is 5, and so on. The pathloss value is based on the current measurement (i.e., together with the $Q_{rxlevmeas}$, say the $n^{th}$) or the previous measurement (say the n-$1^{th}$) to smooth out the possible jittering. The values of a and b may be signaled to the WTRU through RRC signaling, SIB signaling, may be predefined in the specification, or the WTRU may be preconfigured with the values.

(b) The Pcompensation value is obtained from a standards-defined or network-published (via SI) mapping table, such as:

| Pathloss in dB | Pcompensation in dB |
|---|---|
| 30 | 3 |
| 31 | 3.1 |
| 32 | 3.2 |
| ... | ... |
| 150 | 9 |

Other values or tables may also be used.

Coverage Extension Subscription

Closed subscriber group (CSG) coverage extension means that if a CSG cell may be used to extend the coverage of the macro cell, then the CSG cell may be put in a particular place to provide service in areas where the macro cell is not able to provide service. A network operator may deploy CSG cells for coverage extension purposes. Some users may subscribe to this service and others may not.

The WTRU may have a configurable parameter (e.g., one bit) that represents the subscription status of the user/WTRU to these services. At least one of non-access stratum (NAS), RRC, or Open Mobile Alliance (OMA) Device Management signaling may be used by the network to configure this parameter. This parameter may be stored in the WTRU in non-volatile memory, in an application on the Universal Integrated Circuit Card (UICC) (e.g., Universal Subscriber Identity Module (USIM) or LTE equivalent), or in some other place within the WTRU (e.g., Read-Only Memory).

The WTRU may use the coverage extension parameter to determine whether it has access to a coverage extension CSG cell (this may also be referred to as a hybrid cell). A WTRU that detects (in Idle mode or in Connected mode) a coverage extension CSG cell may determine that it has access to that CSG cell if the coverage extension parameter within the WTRU indicates a valid subscription (e.g., by the bit being set) to coverage extension services. The WTRU may detect that a cell is a coverage extension CSG cell using at least one of the following:

(1) The one bit CSG indicator on the system information (e.g., SIB1) being set to true.

(2) A Physical Cell ID corresponding to a CSG cell.

(3) An indicator on the broadcast channel (e.g., one bit) on the system information (e.g., SIB1) indicating that the cell is for coverage extension (e.g., a one bit indicator or a public/private CSG cell indicator). The coverage extension indicator may be an optional bit, may only be present only if the CSG indicator is set to "True," or may be mandatory.

(4) A Physical Cell ID corresponding to a coverage extension CSG cell.

A WTRU with a valid coverage extension CSG cell would not have to verify the presence of the CSG ID of the coverage extension CSG cell in its white list to confirm accessibility and would be able to select/reselect/handover to such a coverage extension CSG cell without verifying the CSG ID on its white list. A WTRU with a valid coverage extension subscription may automatically add the CSG IDs of accessible coverage extension CSG cells to its white list.

A WTRU without a valid coverage extension subscription (indicated by a certain value of the configurable parameter, e.g., the bit not being set) would not be able to access a coverage extension CSG cell. Such a WTRU may, however, have access to this cell if the CSG ID of the coverage extension CSG cell was programmed in its white list.

Although features and elements are described above in particular combinations, each feature or element may be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

What is claimed is:

1. A method for applying cell reselection priorities in a wireless transmit/receive unit (WTRU), comprising:
   receiving a message including first cell reselection priorities and a validity timer associated with the first cell reselection priorities;
   performing cell reselection using the first cell reselection priorities;
   starting the validly timer based on the received message;
   on a condition that the timer expires, discarding the first cell reselection priorities and performing cell reselection using second cell reselection priorities;
   determining, while the validity timer is valid, whether third cell reselection priorities have been received via dedicated signaling; and
   on a condition that the third cell reselection priorities have been received, applying the third cell reselection priorities.

2. The method according to claim 1, wherein the second cell reselection priorities are obtained by reading system information.

3. The method according to claim 1, wherein the first cell selection priorities are received using dedicated signaling.

4. The method of claim 1, wherein during cell reselection, on a condition that a detected cell is a closed subscriber group (CSG) cell, camping, by the WTRU, on the detected cell only if a CSG indicator of the cell is on a white list; wherein on a condition that the detected cell is a hybrid CSG cell, camping, by the WTRU, on the cell regardless of whether the CSG indicator of the detected cell is on the white list.

5. A wireless transmit/receive unit (WTRU) comprising:
a receiver and a processor configured to receive a message including first cell reselection priorities and a validity timer associated with the first cell reselection priorities;
the processor is further configured to perform cell reselection using the first cell reselection priorities;
the processor is further configured to start the validity timer in response to the received message;
the processor is further configured, on a condition that the timer expires, to discard the first cell reselection priorities and perform cell reselection using second cell reselection priorities; and
the processor is further configured, while the validity timer is valid, to determine whether third cell reselection priorities have been received via dedicated signaling, and, on a condition that the third cell reselection priorities have been received, to apply the third cell reselection priorities.

6. The WTRU according to claim 5, wherein the second cell reselection priorities are obtained from system information.

7. The WTRU according to claim 5, wherein the first cell selection priorities are received using dedicated signaling.

8. The WTRU of claim 5, wherein the processor is further configured during cell reselection, on a condition that a detected cell is a closed subscriber group (CSG) cell, to camp on the detected cell only if a CSG indicator of the cell is on a white list; wherein on a condition that the detected cell is a hybrid CSG cell, to camp on the cell regardless of whether the CSG indicator of the detected cell is on the white list.

9. The method according to claim 1, wherein the message is received by dedicated signaling and includes dedicated cell reselection priorities as the first cell reselection priorities, and
the second cell reselection priorities are received in broadcast system information.

10. The method according to claim 9, wherein the validity timer indicates a length of time the dedicated cell reselection priorities are valid.

11. The WTRU according to claim 5, wherein the message is received by dedicated signaling and includes dedicated cell reselection priorities as the first cell reselection priorities, and
the second cell reselection priorities are received in broadcast system information.

12. The WTRU according to claim 11, wherein the validity timer indicates a length of time the dedicated cell reselection priorities are valid.

* * * * *

UNITED STATES PATENT AND TRADEMARK OFFICE
CERTIFICATE OF CORRECTION

PATENT NO. : 9,585,067 B2
APPLICATION NO. : 14/720144
DATED : February 28, 2017
INVENTOR(S) : Peter S. Wang et al.

It is certified that error appears in the above-identified patent and that said Letters Patent is hereby corrected as shown below:

In the Specification

At Column 7, Line 62, after the phrase "value in dB,", delete "$Q_{xlevmeas}$" and insert therefor --$Q_{rxlevmeas}$--.

At Column 8, Line 10, after the phrase "(i.e.,", delete "$Q_{xlevmeas}$" and insert therefor --$Q_{rxlevmeas}$--.

At Column 8, Line 19, delete "$S_{rxlev}=Q_{xlevmeas}-(Q_{xlevmin} - Q_{xlevminoffset})$" and insert therefor --$S_{rxlev}=Q_{rxlevmeas}-(Q_{xlevmin} - Q_{xlevminoffset})$--.

At Column 8, Line 25, after the word "require", delete "$Q_{xlevmeas}$" and insert therefor --$Q_{rxlevmeas}$--.

At Column 8, Line 30, after the word "requiring", delete "$Q_{xlevmeas}$" and insert therefor --$Q_{rxlevmeas}$--.

At Column 8, Line 33, after the word "requiring", delete "$Q_{rxievmeas}$" and insert therefor --$Q_{rxlevmeas}$--.

At Column 8, Line 41, after the phrase "i.e., the", delete "pathloss = CELL_TX_POWER-$Q_{rxievmeas}$)" and insert therefor --pathloss = CELL_TX_POWER-$Q_{rxlevmeas}$)--.

Signed and Sealed this
Seventeenth Day of April, 2018

Andrei Iancu
*Director of the United States Patent and Trademark Office*